United States Patent
Casper et al.

(10) Patent No.: US 8,736,765 B2
(45) Date of Patent: May 27, 2014

(54) METHOD AND APPARATUS FOR DISPLAYING AN IMAGE WITH A PRODUCTION SWITCHER

(75) Inventors: David Alan Casper, Nevada, CA (US); Ralph Andrew Silberstein, Grass Valley, CA (US); Donald Johnson Childers, Jr., Grass Valley, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 984 days.

(21) Appl. No.: 12/225,127

(22) PCT Filed: Mar. 28, 2006

(86) PCT No.: PCT/US2006/011057
§ 371 (c)(1),
(2), (4) Date: Sep. 15, 2008

(87) PCT Pub. No.: WO2007/111591
PCT Pub. Date: Oct. 4, 2007

(65) Prior Publication Data
US 2009/0273715 A1  Nov. 5, 2009

(51) Int. Cl.
*H04N 9/74* (2006.01)

(52) U.S. Cl.
USPC ........... 348/578; 348/584; 348/581; 348/565; 348/705; 348/706; 348/722; 715/700

(58) Field of Classification Search
USPC ......... 348/578, 584, 705, 706, 722, 581, 565; 715/700
See application file for complete search history.

(56) References Cited

U.S. PATENT DOCUMENTS

| | | | | |
|---|---|---|---|---|
| 4,891,743 A | * | 1/1990 | May et al. ................. | 363/87 |
| 5,282,038 A | * | 1/1994 | Lowe ......................... | 348/659 |
| 5,825,336 A | * | 10/1998 | Fujita et al. .............. | 345/2.3 |
| 5,999,186 A | * | 12/1999 | Jackson ..................... | 345/420 |
| 6,437,834 B1 | * | 8/2002 | Tagami ...................... | 348/705 |
| 6,556,253 B1 | * | 4/2003 | Megied et al. ............ | 348/565 |
| 6,624,854 B1 | * | 9/2003 | Isogai et al. .............. | 348/744 |
| 7,903,172 B2 | * | 3/2011 | Palgrave-Moore et al. .. | 348/441 |
| 2002/0021259 A1 | * | 2/2002 | Itaki et al. ................ | 345/1.1 |
| 2005/0219409 A1 | * | 10/2005 | Cheng ........................ | 348/448 |
| 2007/0127791 A1 | * | 6/2007 | Ernvik et al. ............. | 382/128 |
| 2009/0167949 A1 | * | 7/2009 | Casper et al. ............. | 348/584 |

FOREIGN PATENT DOCUMENTS

| | | |
|---|---|---|
| EP | 1 326 436 A2 | 7/2003 |
| EP | 1326436 | 7/2003 |
| EP | 1681860 | 7/2006 |
| JP | 62220084 | 9/1987 |
| JP | 08032875 | 2/1996 |
| JP | 8205030 | 8/1996 |
| JP | 11175045 | 7/1999 |
| JP | 2001175239 A | 6/2001 |
| JP | 2003195843 A | 7/2003 |
| JP | 2003271118 A | 9/2003 |
| JP | 2003345327 | 12/2003 |

OTHER PUBLICATIONS

International Search Report, Oct. 11, 2006.
European Patent Office, Examination Report for the European Application No. 06739706.7 dated Sep. 15, 2011.
Translation of Japanese Office Action in Japanese Application No. 2009-502732 mailed Nov. 2, 2010.
International Preliminary Report on Patentability in International Application No. PCT/US2006/011057 dated Sep. 30, 2008.
Written Opinion of the International Searching Authority in International Application No. PCT/US2006/011057 from the European Patent Office.

* cited by examiner

*Primary Examiner* — Jefferey Harold
*Assistant Examiner* — Mustafizur Rahman
(74) *Attorney, Agent, or Firm* — Arent Fox LLP

(57) ABSTRACT

A video production switcher comprises a number of mix effects (M/E) units and a controller. The latter comprises a control layer that controls the M/Es to provide video outputs through projection devices that give the appearance of displaying one unified pixel space canvas.

17 Claims, 15 Drawing Sheets

FIG. 3

Table One

| | $L_{x,\,105\text{-}1}$ | $L_{x,\,105\text{-}2}$ | $L_{x,\,105\text{-}3}$ |
|---|---|---|---|
| local space origin in $G_x$ | 0 | 100 | 200 |
| local space width | 100 | 100 | 100 |
| local space end in $G_x$ | 100 | 200 | 300 |

FIG. 8

Table Two

| | T1 | T2 | T3 | T4 | T5 |
|---|---|---|---|---|---|
| $G_x$ (global sapce) | 25 | 75 | 125 | 175 | 225 |
| $L_{x,\ 105-1}$ (local space) | 25 | 75 | 125 | 175 | 225 |
| $L_{x,\ 105-2}$ (local space) | -75 | -25 | 25 | 75 | 125 |
| $L_{x,\ 105-3}$ (local space) | -175 | -125 | -75 | -25 | 25 |

FIG. 10

Table Three

| | T1 |
|---|---|
| $G_x$ (global space) | 50 |
| $L_{x,\,105\text{-}1}$ (local space) | 50 |
| $L_{x,\,105\text{-}2}$ (local space) | -50 |
| $L_{x,\,105\text{-}3}$ (local space) | -150 |

METHOD AND APPARATUS FOR DISPLAYING AN IMAGE WITH A PRODUCTION SWITCHER

This application claims the benefit, under 35 U.S.C. §365 of International Application PCT/US2006/011057 filed Mar. 28, 2006, which was published in accordance with PCT Article 21(2) on Oct. 4, 2007 in English.

BACKGROUND OF THE INVENTION

The present invention generally relates to video production systems and, more particularly, to the production of video effects.

Producers, or stagers, of live events may enhance these events by providing a high quality video experience that is delivered on as large a projection screen as possible to the audience. Typically, the projection screen is arranged in back of, or above, the location of the live events and multiple video outputs are projected, often side-by-side onto the projection screen.

To meet this particular need, a number of vendors provide equipment that provide such large projection screen effects. Unfortunately, these systems require either specialized hardware or have real-time limitations. For example, systems like the Montage from Vista and the Encore from Barco/Folsom provide large projection screen effects by requiring use of an internal large pixel buffer. In these systems, individual video outputs are defined as viewports into this buffer, and directly output the respective contents of the viewport onto a particular portion of the large projection screen. All operations (such as flying video picture-in-pictures (PIPs) and keys around) are done with one processor in this one pixel space. Another company, Dataton, has a video product switcher called Watchout™ that also delivers large projection screen effects. However, video material has to be pre-produced (rendered) in advance of the live event and, as such, does not support true real-time video production—it only supports live video inserts into the pre-rendered windows.

SUMMARY OF THE INVENTION

We have observed that it is possible to control existing video production switchers in such a way as to provide video effects on a large projection screen without requiring either specialized hardware or limitations on real-time video production. In particular, and in accordance with the principles of the invention, each mix effects unit (M/E), of a video production switcher, maps an image to a global space, the global space associated with a display; and uses a transform matrix that remaps at least a portion of the image from the global space to at least one of a number of local spaces, each local space associated with a M/E and a portion of the display.

In an embodiment of the invention, a video production switcher comprises a number of M/Es, each M/E providing a video output signal for use in displaying images on a display; and a controller for controlling the presentation of video effects on the display by each mix effects bank as a function of a mapping between a local space associated with each M/E and a global space associated with the display. As a result, the controller controls the M/Es to provide screen outputs that give the appearance of displaying one unified pixel space canvas.

BRIEF DESCRIPTION OF THE DRAWINGS

FIGS. 2-3 show mappings for M/Es to portions of a screen in accordance with the principles of the invention;

FIG. 8 shows Table Two illustrating local to global coordinate mappings for the examples of FIGS. 5-7;

FIG. 10 shows Table Three illustrating local to global coordinate mappings for the example of FIG. 9;

DETAILED DESCRIPTION

Other than the inventive concept, the elements shown in the figures are well known and will not be described in detail. Also, familiarity with video production is assumed and is not described in detail herein. In this regard, it should be noted that only that portion of the inventive concept that is different from known video production switching is described below and shown in the figures. As such, familiarity with mix effects (M/E) units, digital video effects (DVE) channels, mixer bus, keyframes, transform matrix calculations for images, etc., is assumed and not described herein. It should also be noted that the inventive concept may be implemented using conventional programming techniques, which, as such, will also not be described herein. Finally, like-numbers on the figures represent similar elements.

Figure 1:
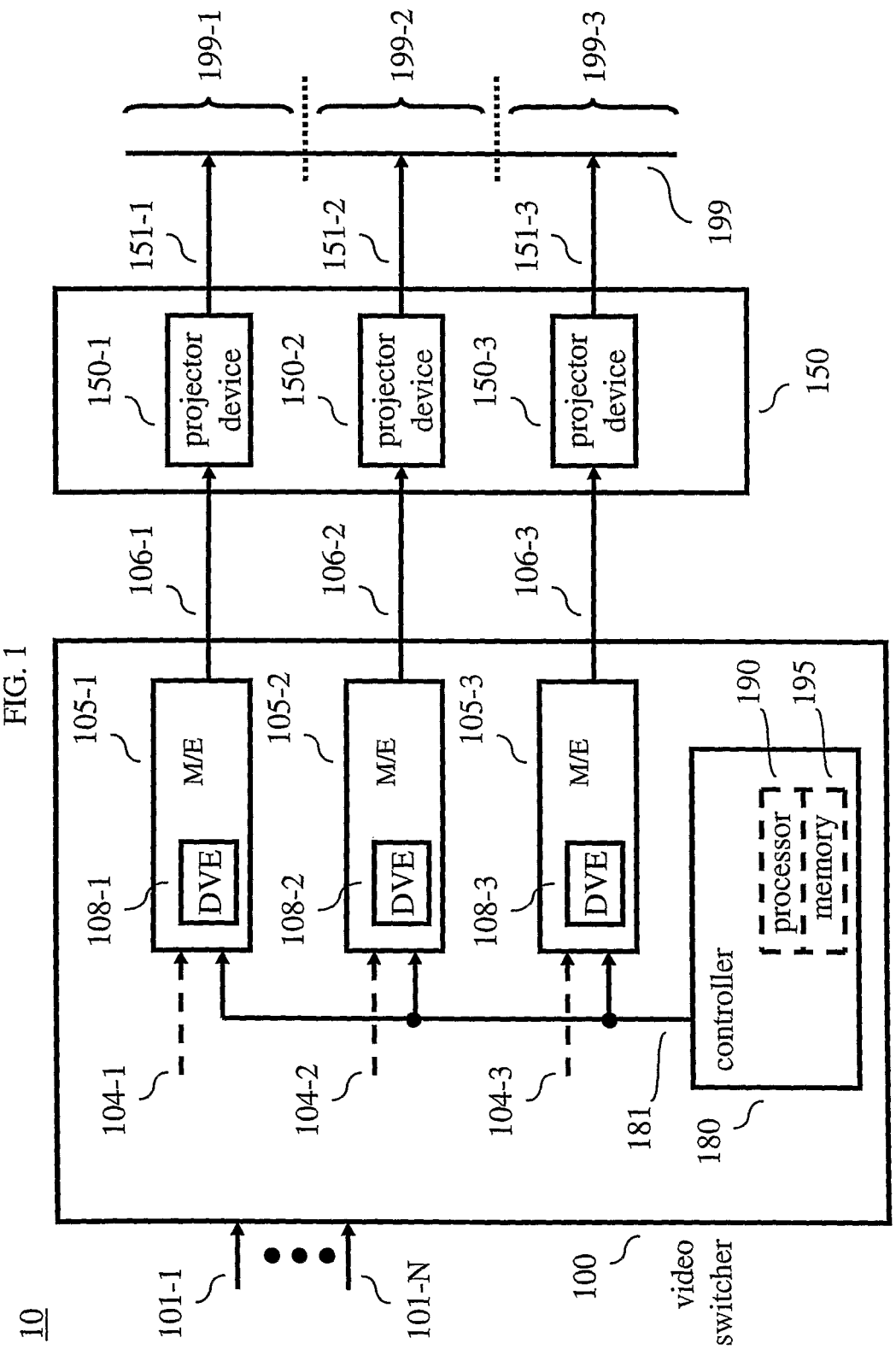
FIG. 1 shows an illustrative video production switcher in accordance with the principles of the invention.

An illustrative embodiment of a video system 10 in accordance with the principles of the invention is shown in FIG. 1. As noted above, only those portions of video system 10 relative to the inventive concept are shown. For example, video production switcher 100 may include one, or more, switching matrices as known in the art for enabling the selection and switching of a variety of video signals among various elements of video production switcher 100 to achieve particular effects and also to enable the selection of particular video signals to be provided as the main (also referred to as the program, or PGM) output of video production switcher 100. However, these one, or more, switching matrices are not relevant to the inventive concept and, as such, are not shown in FIG. 1.

Video system 10 comprises video production switcher 100, projector 150 and projection screen 199 (also referred to herein as a display). The latter is a wide extended screen and comprises a number of portions as represented by display portion 199-1, 199-2 and 199-3 for displaying video content provided by video display signals 151-1, 151-2 and 151-3, respectively. In this regard, projector 150 comprises a number of projection devices 150-1, 150-2 and 150-3 for providing the particular video display signals to the respective portion of projection screen 199. Other than the inventive concept, video production switcher 100 switches video input signals from one, or more, sources, as represented by input signals 101-1 through 101-N, to one or more outputs, as represented by screen output signals 106-1, 106-2 and 106-3 for eventual display on a respective portion of projection screen 199. The video input sources may be, e.g., cameras, video tape recorders, servers, digital picture manipulators (video effects devices), character generators, and the like. As known in the art, the output signals are representative of PGM signals as known in the art, i.e., the final output signal of the video production switching equipment.

Turning now to video production switcher 100, this element comprises a controller 180 and a number of mix effects (M/E) units, 105-1, 105-2 and 105-3. Each M/E, 105-1, 105-2 and 105-3, receives one, or more, video signals (as represented by respective video signals 104-1, 104-2 and 104-3 in dashed-line form) for processing to provide output signals 106-1, 106-2 and 106-3, respectively. Each M/E is controlled by controller 180, which is a software-based controller as represented by processor 190 and memory 195 shown in the form of dashed boxes in FIG. 1. In this context, computer programs, or software, are stored in memory 195 for execution by processor 190. The latter is representative of one or more stored-program control processors and these do not have to be dedicated to the controller function for the M/Es, e.g., processor 190 may also control other functions and or devices (not shown) of video production switcher 100. Memory 195 is representative of any storage device, e.g., random-access memory (RAM), read-only memory (ROM), etc.; may be internal and/or external to video production switcher 100; and is volatile and/or non-volatile as necessary.

Figure 2:
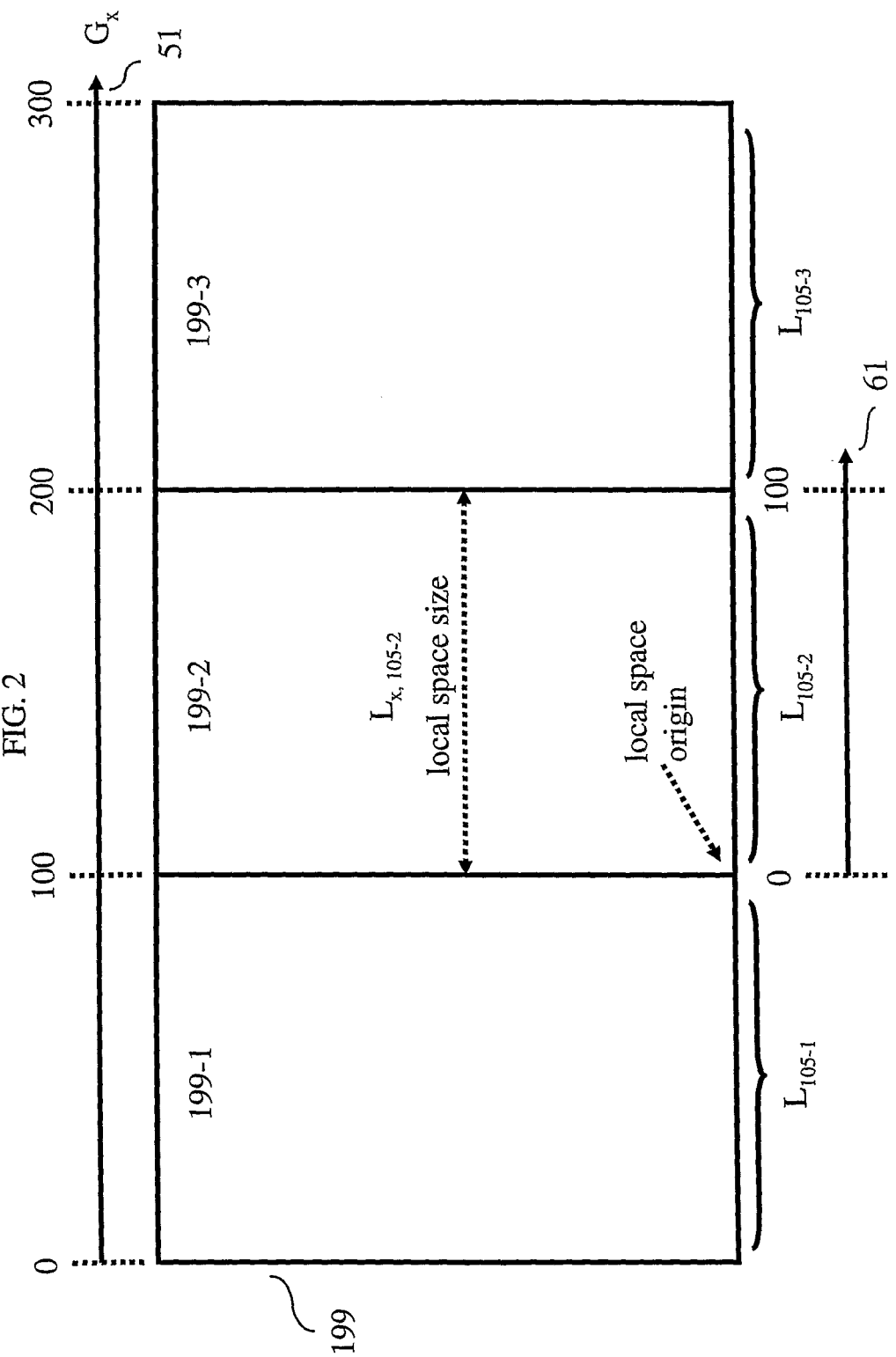

In accordance with the principles of the invention, controller 180 controls M/Es 105-1, 105-2 and 105-3, via control signaling 181, to provide output signals 106-1, 106-2 and 106-3, such that it appears that projection screen 199 is displaying one unified pixel space canvas. In particular, projection screen 199 is mapped into a projection screen coordinate space (also referred to herein as a global coordinate space or global space) and each M/E has a local space that is mapped into this global coordinate space. For this example, it is assumed that the coordinate space is Cartesian. However, the inventive concept is not so limited. The mapping of each M/E into the global coordinate space is illustrated in FIG. 2. For illustration purposes, only one dimension is described herein, e.g., the x-dimension. Extension of the inventive concept to two, or three, dimensions is straightforward. As shown in FIG. 2, the width of projection screen 199 is mapped to a global coordinate space as represented by x-dimension axis 51. For the purposes of this example, it is assumed that the width of projection screen 199 corresponds to the effective display width, i.e., the total width of projection screen 199 that is capable of showing an image (as compared to the actual physical width, which may be larger than the effective display area). As shown in FIG. 2, projection screen 199 is made up of three display portions, 199-1, 199-2 and 199-3. Illustratively, the left side of projection screen 199 starts at a global x coordinate value of 0, i.e., $G_x=0$, and the right side of projection screen 199 ends at a value of 300, i.e., $G_x=300$. In this example, it is assumed that the effective display width is 300 elements wide and that each smaller screen has an effective width of 100 elements. It should be noted that each "element" of the coordinate space corresponds to either pixels, inches, centimeters, etc. However, whether the actual type of "element" represents a pixel, an inch, screen unit, etc., is irrelevant to the inventive concept. Further, the dimensions of projection screen 199 are merely illustrative for the purpose of describing the inventive concept. The projection screen may display standard video (e.g., 4:3 video format), high definition video (16:9 video format), etc. In accordance with the principles of the invention, each M/E is associated with a particular local space that is mapped into this global coordinate space such that each local space is associated with one of the display portions. One such local space, $L_{105-2}$, for M/E 105-2 is shown in FIG. 2. As can be observed from FIG. 2, $L_{105-2}$, is associated with display portion 199-2 and, as illustrated by x-dimension axis 61 of $L_{105-2}$, the origin of $L_{x, 105-2}$ is mapped to $G_x=100$ and the size of $L_{x, 105-2}$ is 100. Referring now to FIG. 3, the mappings of each local space of each M/E to the global coordinate space is shown in Table One. For example, the local space for M/E 105-3, $L_{x, 105-3}$, has an origin at $G_x=200$, a local space width of 100 and, as a result, ends at $G_x=300$. In this example, it is assumed that the boundaries of the local space of each ME switcher touch the boundaries of adjacent local spaces after mapping to the global coordinate space. However, the inventive concept is not so limited and the local spaces can be mapped such that there is an amount of overlap with a blending region. Indeed, there is no limitation to the spatial relationship between the local spaces, e.g., local spaces could be mapped such that there are gaps between them (expressed as a percentage of width) in the global coordinate space, and the local spaces can be of differing sizes.

Figure 4:
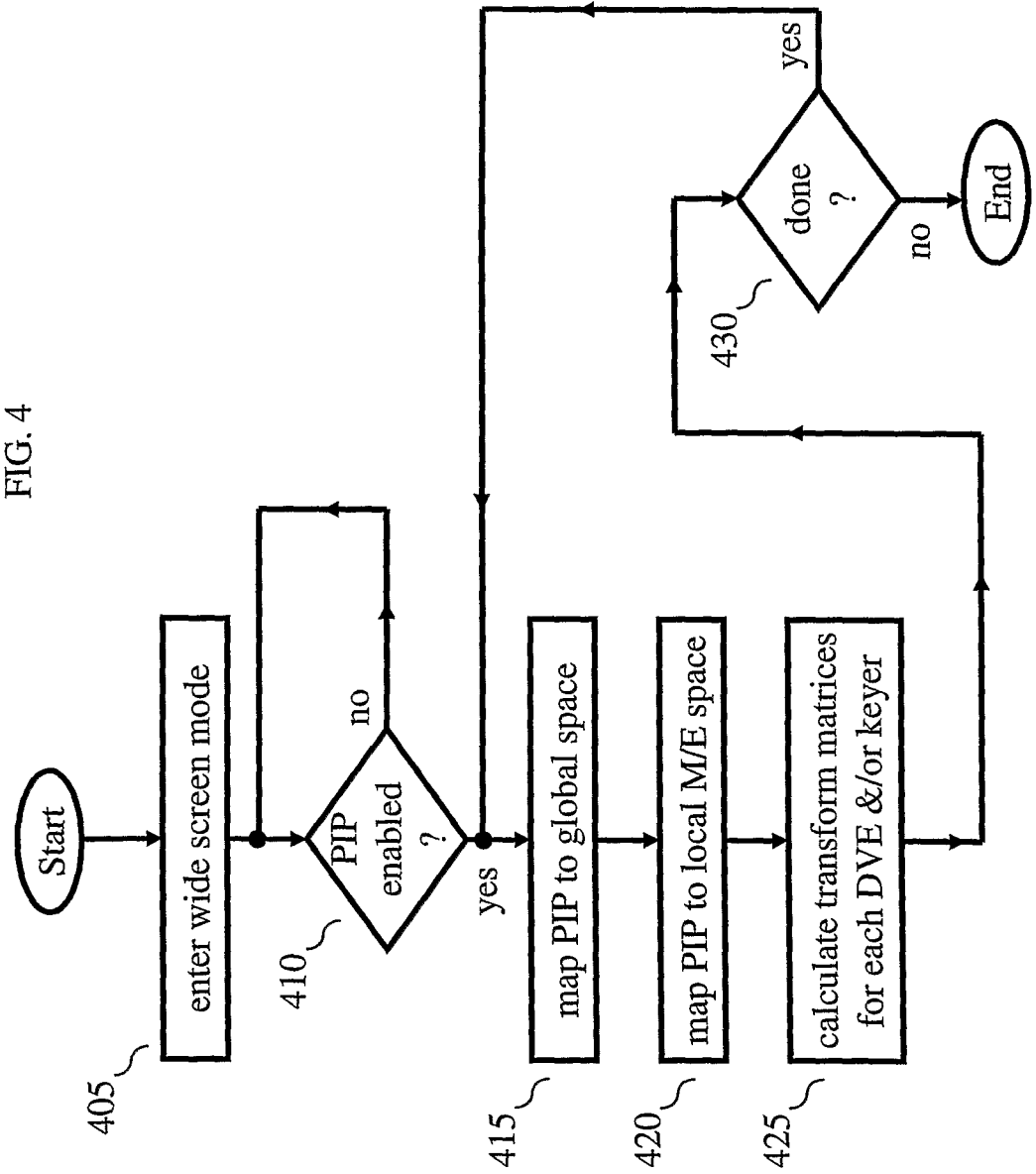
FIG. 4 shows an illustrative flow chart for use in a video production switcher in accordance with the principles of the invention.
Figure 5:
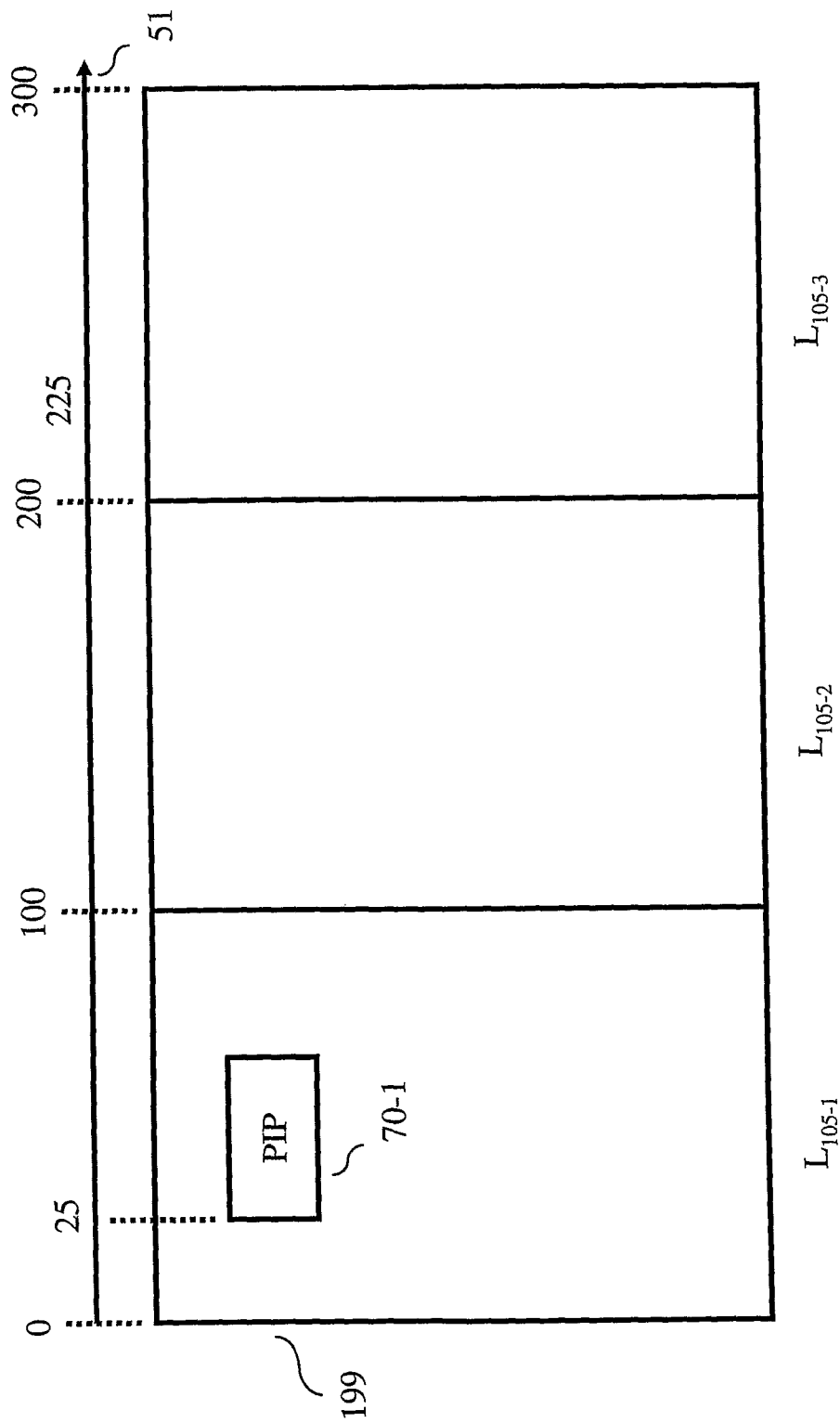
FIGS. 5-7 show illustrative screen outputs in accordance with the principles of the invention.

Turning now to FIG. 4, an illustrative flow chart for use in video production switcher 100 in accordance with the principles of the invention is shown. Attention should also be directed to FIGS. 5-7, which further illustrate projection screen 199 and the operation of each M/E in the context of a particular video effect at different points in time. In step 405 of FIG. 4, controller 180 enters a "widescreen mode" for the display of images, e.g., digit video effects (DVE) channels, on projection screen 199. The entry of widescreen mode can be affected in any one of a number of ways, e.g., by operator input via a control panel or menu system (not shown) of video production switcher 100. Once in widescreen mode, controller 180 checks, in step 410, if at least one PIP or keyed effect (such as luminance keying or chroma keying) is activated via the control panel as known in the art. It should be noted that for ease of reference further use of the term "PIP" herein refers to any method for overlaying live video, stills, graphics, or titles over a background, including but not limited to a scaled PIP, luminance keying and/or chroma keying, etc. In this example, it is assumed that at a time T1 an operator selects an image, e.g., PIP effect 70, via the control panel, from a number of available effects. Once a PIP is activated, controller 180 maps the PIP effect, in this case PIP effect 70, to the global coordinate space in step 415, e.g., the operator, specifies the initial location of PIP effect 70 in the global coordinate space as $G_x=25$. For this example, it is presumed that various properties of PIP effect 70, such as its dimensions, are predetermined and, as such, controller 180 can, as needed, map all requisite dimensions of PIP effect 70 into the global coordinate space. For this example, PIP effect 70 has a width of 40 elements. In step 420, controller 180 further maps the PIP effect from the global coordinate space to a local space to identify the one, or more, M/Es required to display the PIP effect. In this example, controller 180 maps PIP effect 70 to the local space and determines that PIP effect 70 is completely mapped to M/E 105-1 since the entire width of PIP effect 70 resides within $L_{105-1}$ (i.e., the starting point of the effect, 25, plus the width of the effect, e.g., 40, is equal to 65). Finally, in step 425, controller 180 calculates transform matrices for each identified M/E for the active DVE channel, so that the identified M/E produces its section of the video for display on projection screen 199 as defined by its local space with the appropriate placement of the PIP effect (or portion thereof) in that local space as determined by the DVE channel. Turning briefly back to FIG. 1, it can be observed that each M/E includes a DVE channel or resize engine (or utilizes an external DVE channel or resize engine or scaler) as represented by DVE channels 108-1, 108-2 and 108-3. It should also be noted, and as stated in step 425 of FIG. 4, that in addition to, or instead of, a DVE channel each M/E can use its keyer (not shown) for transformation of the overlayed effect. Control of M/Es 105-1, 105-2 and 105-3 is, e.g., via control signaling 181 of FIG. 1. In this example, at time T1, the calculated transform matrix for M/E 105-1 results in PIP effect 70 being displayed by M/E 105-1 as represented by PIP effect 70-1 of FIG. 5.

Figure 6:
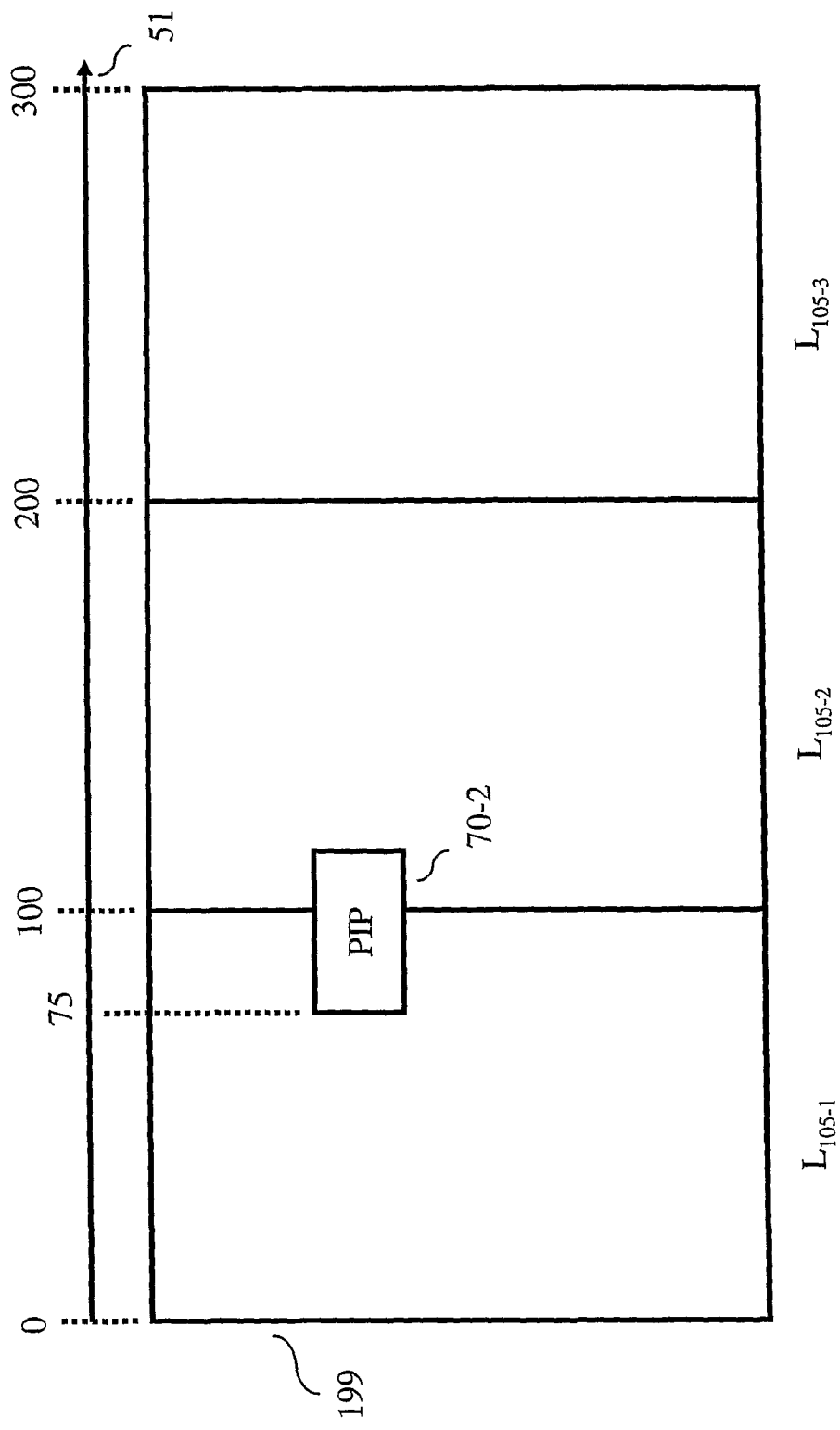
Figure 7:
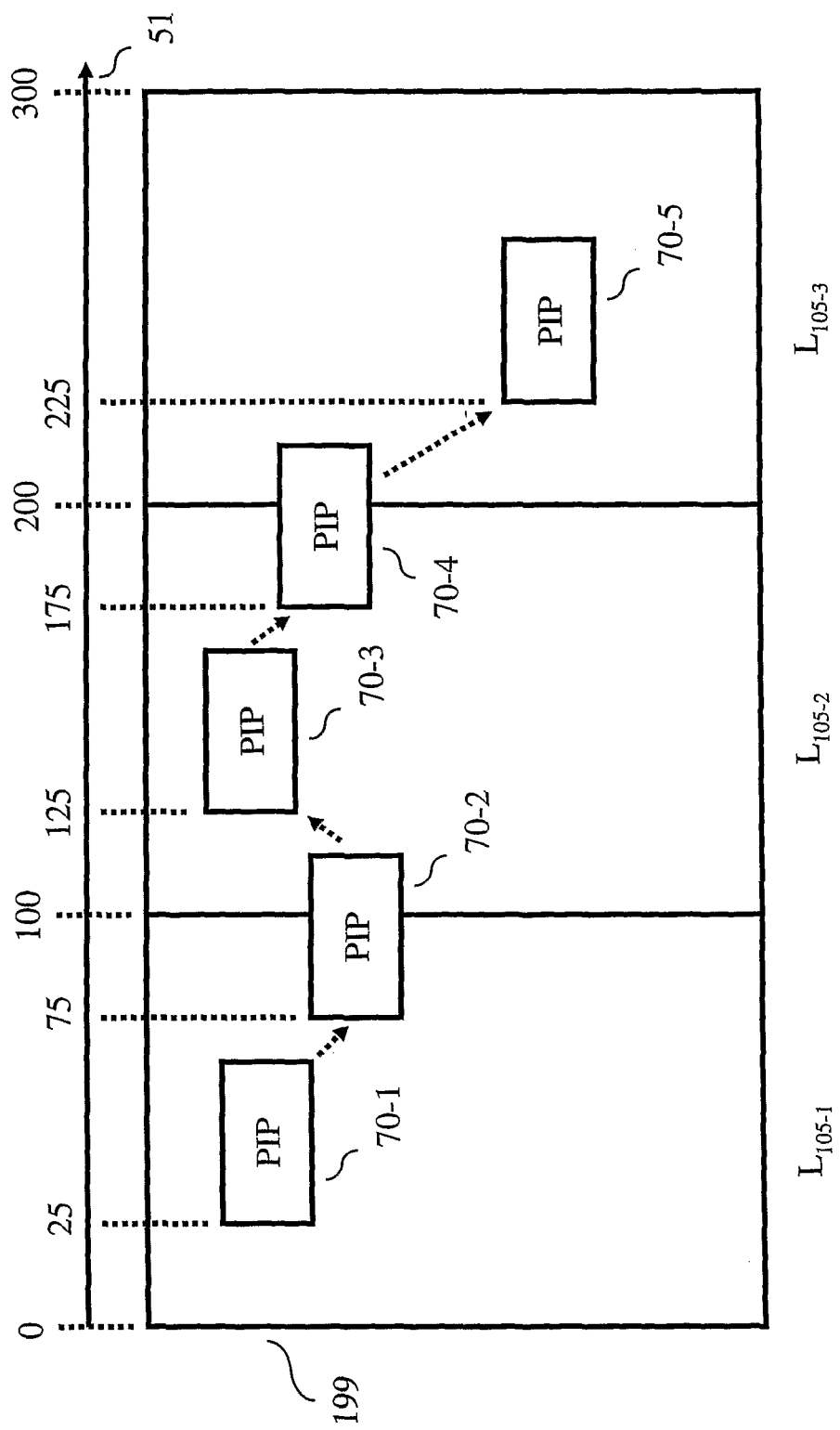

As illustrated by step 430 of FIG. 4, this process continues until the widescreen mode is completed. In particular, FIG. 6 shows the progression of PIP effect 70 over projection screen 199 at another point in time. Other than the inventive concept, the movement of PIP effect 70 over time can be performed manually by the operator via the control panel, or automatically via a programmed effect as known in the art. For example, the DVE can be controlled as a keyframed timeline effect and/or by direct manual control using a control panel equipped with, e.g., a joystick, lever arms, knobs, and/or buttons. Continuing with this example, at a later time T2, PIP effect 70 is specified as starting at global coordinate $G_x$=75. In step 420, controller 180 determines that PIP effect 70 is partially mapped to M/E 105-1 and partially mapped to M/E 105-2 since the entire width of PIP effect 70 resides across both $L_{105-1}$ and $L_{105-2}$ (i.e., the starting point of the effect, 75, plus the width of the effect, e.g., 40, is equal to 115, which exceeds the width of $L_{x, 105-1}$ and extends by 15 elements into $L_{105-2}$). As noted above, in step 425, controller 180 calculates transform matrices for each identified M/E for the active DVE channel, so that the identified M/E produces its section of the video for display on projection screen 199. In this example, at time T2, the calculated transform matrix for M/E 105-1 results in PIP effect 70 being partially displayed by MIE 105-1 and the calculated transform matrix for M/E 105-2 results in the remaining portion of PIP effect 70 being displayed by M/E 105-2 as represented by PIP effect 70-2 of FIG. 6. Similar comments apply to the creation of PIP effect 70 at other times T3, T4 and T5, as shown in FIG. 7 for PIP effects 70-3, 70-4 and 70-5, respectively. As can be observed from FIG. 7, this figure illustrates the motion of PIP effect 70 across projection screen 199 at times T1, T2, T3, T4 and T5.

Referring now to FIG. 8, Table Two further illustrates the relationship between the global coordinate space and the local space of each M/E for the x-dimension in the context of PIP effect 70 at times T1, T2, T3, T4 and T5. Given the above-described spatial relationships between the three local spaces, it can be clearly seen that one simply subtracts the $G_x$ offset of the origin of a particular M/E local space in the global space to convert the position of PIP effect 70 in the global coordinate system to the M/E local space. For example, at time T3, PIP effect 70 is located at $G_x$=125, which corresponds to being 25 elements within $L_{105-2}$ since the $G_x$ offset for $L_{x, 105-2}$ is equal to 100 from FIG. 2.

Figure 9:
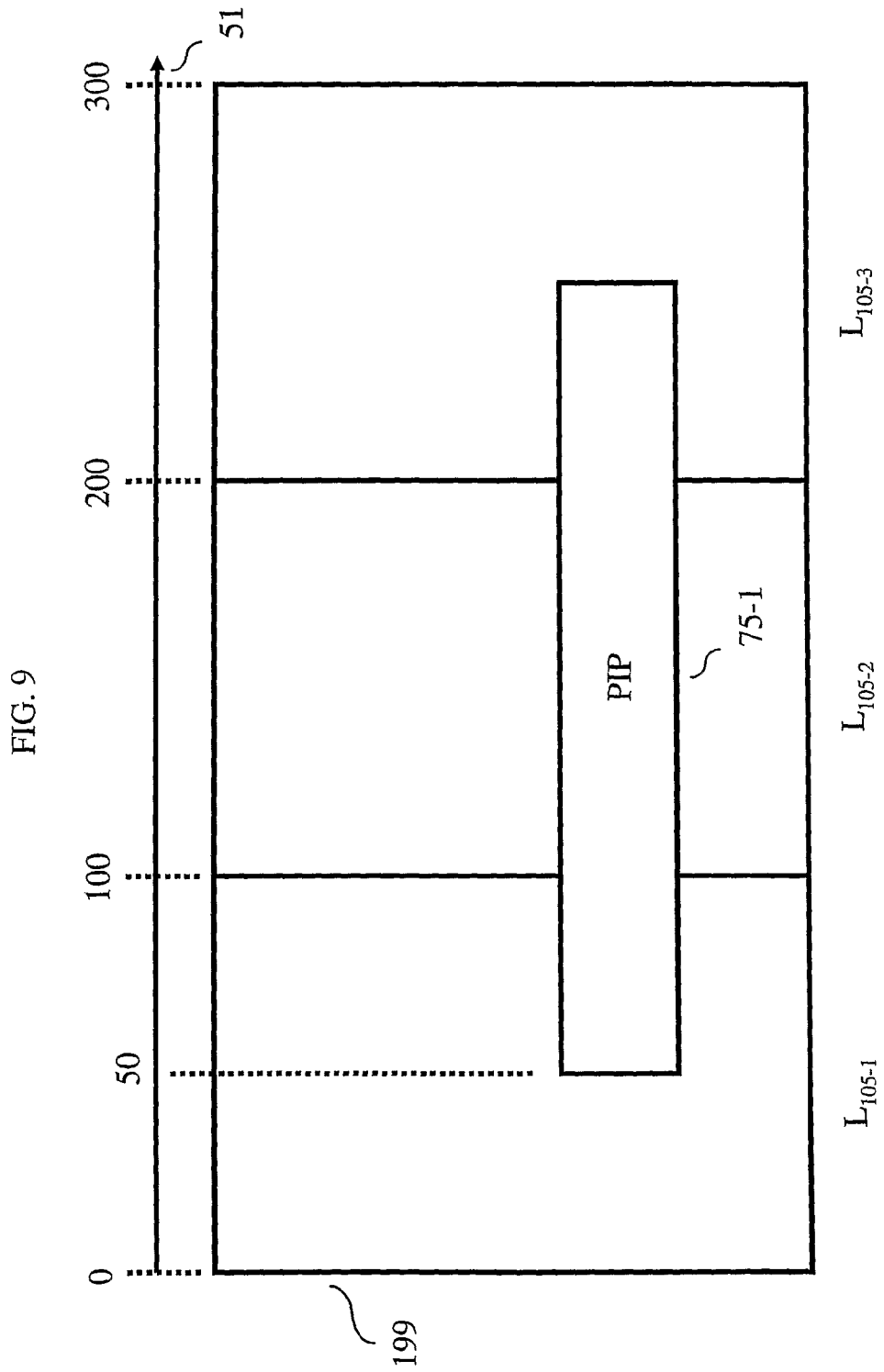
FIG. 9 shows another illustrative screen output in accordance with the principles of the invention.

Another example is shown in FIG. 9 for a PIP effect 75 displayed on projection screen 199 at a time T1. In this example, PIP effect 75 has a predetermined width of 200 elements. Continuing with the flow chart of FIG. 4, at a later time T1, PEP effect 75 is specified as starting at global coordinate $G_x$=50. In step 420, controller 180 determines that PIP effect 75 is partially mapped to M/E 105-1, partially mapped to M/E 105-2 and partially mapped to M/E 105-3 since the entire width of PIP effect 75 resides across $L_{105-1}$, $L_{105-2}$ and $L_{105-3}$ (i.e., the starting point of the effect, 50, plus the width of the effect, e.g., 200, is equal to 250 which extends 50 elements across $L_{x, 105-1}$, across the entire width of $L_{x, 105-2}$ and extends by 50 elements into $L_{x, 105-3}$). As noted above, in step 425, controller 180 calculates transform matrices for each identified M/E for the active DVE channel, so that the identified M/E produces its section of the video for display on projection screen 199. In this example, at time T1, the calculated transform matrices result in PIP effect 75 being partially displayed by M/E 105-1, M/E 105-2 and M/E 105-3 as represented by PIP effect 75-1 of FIG. 9. Referring now to FIG. 10, Table Three (like Table Two of FIG. 8) further illustrates the relationship between the global coordinate space and the local space of each M/E for the x-dimension in the context of PIP effect 75 at time T1 and starting at $G_x$=50. In this example, PIP effect 75 exists in all three M/E local spaces.

Figure 11:
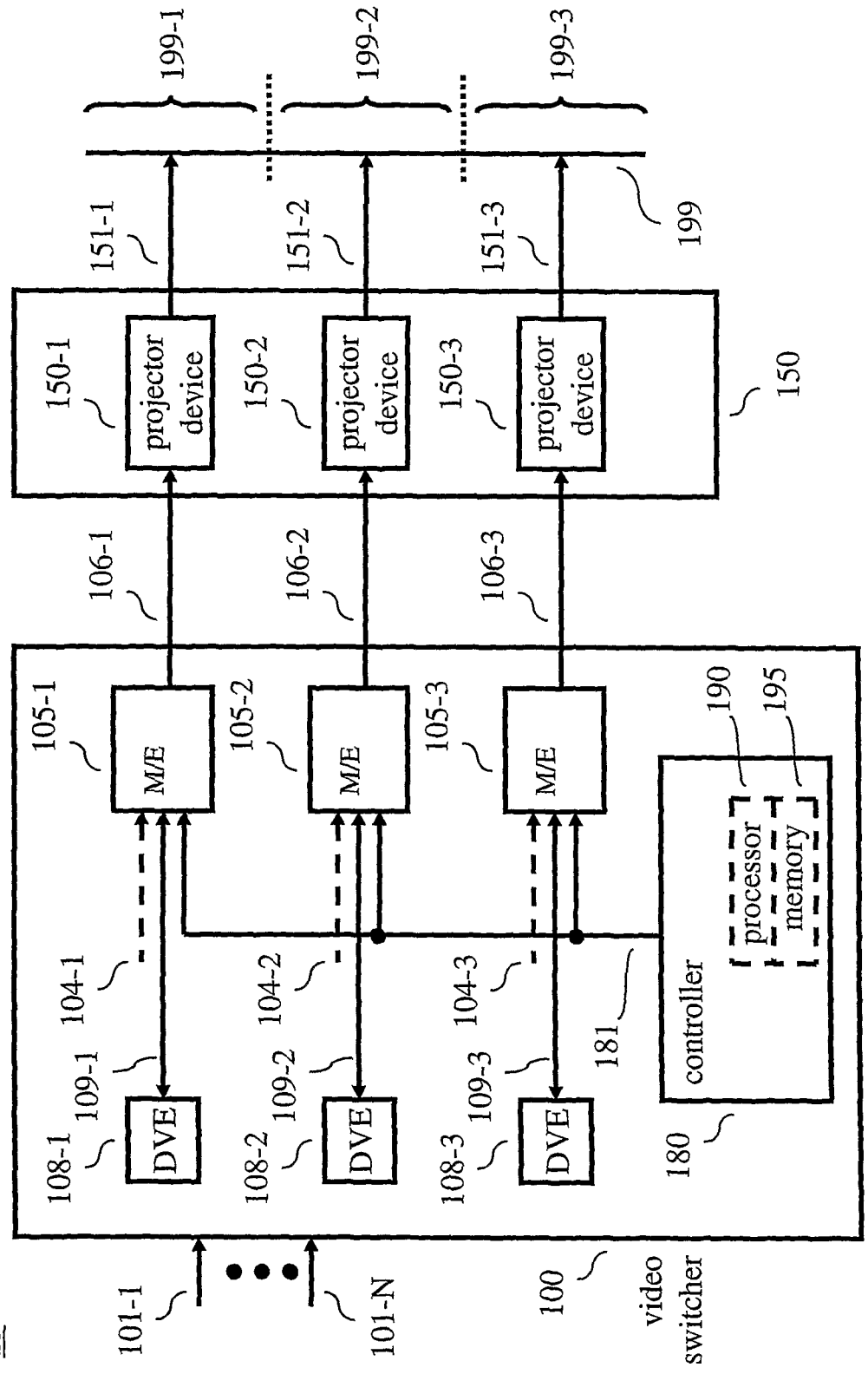
FIG. 11 shows another illustrative video production switcher in accordance with the principles of the invention.
Figure 12:
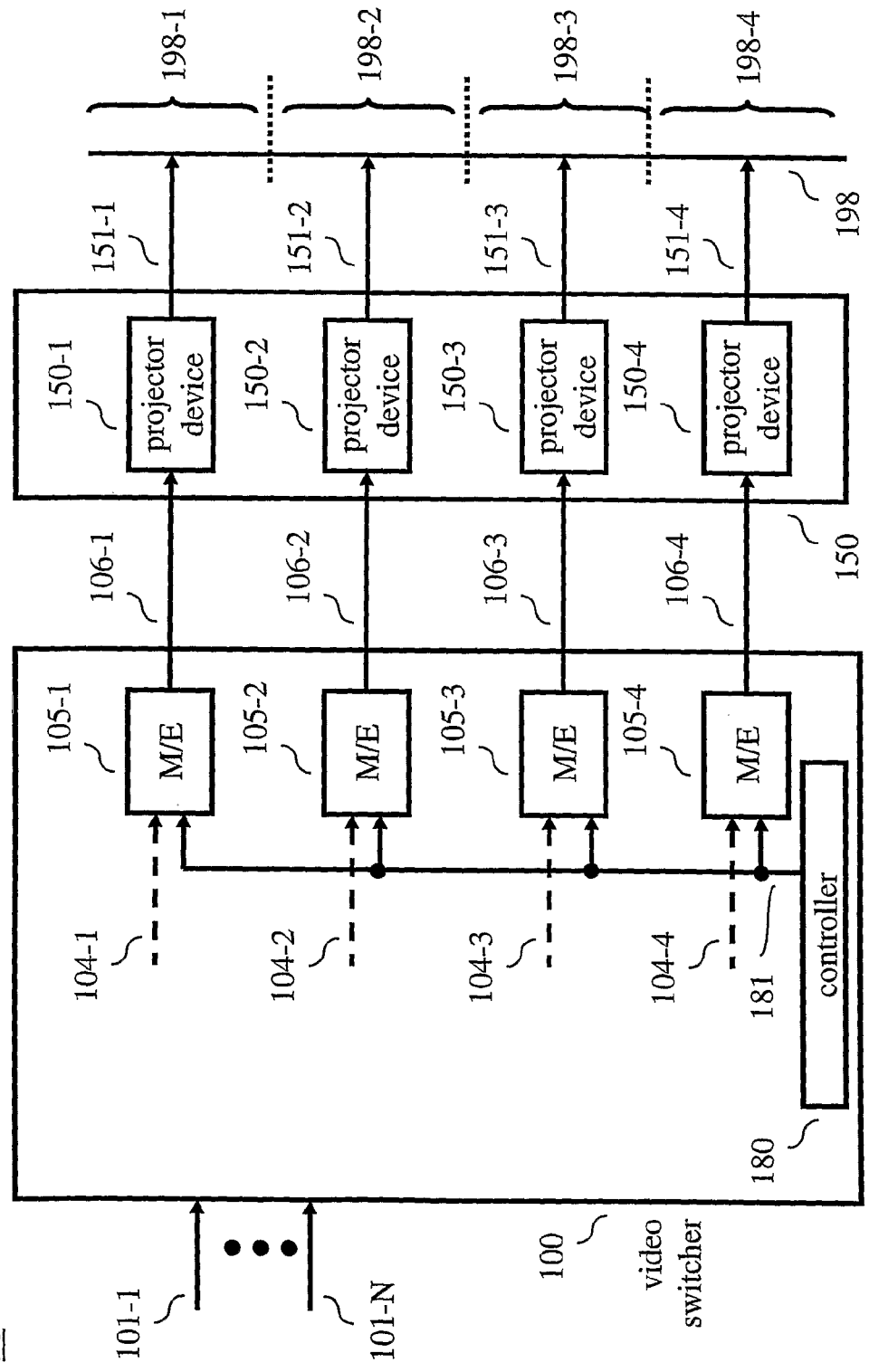
FIG. 12 shows another illustrative video production switcher in accordance with the principles of the invention.
Figure 13:
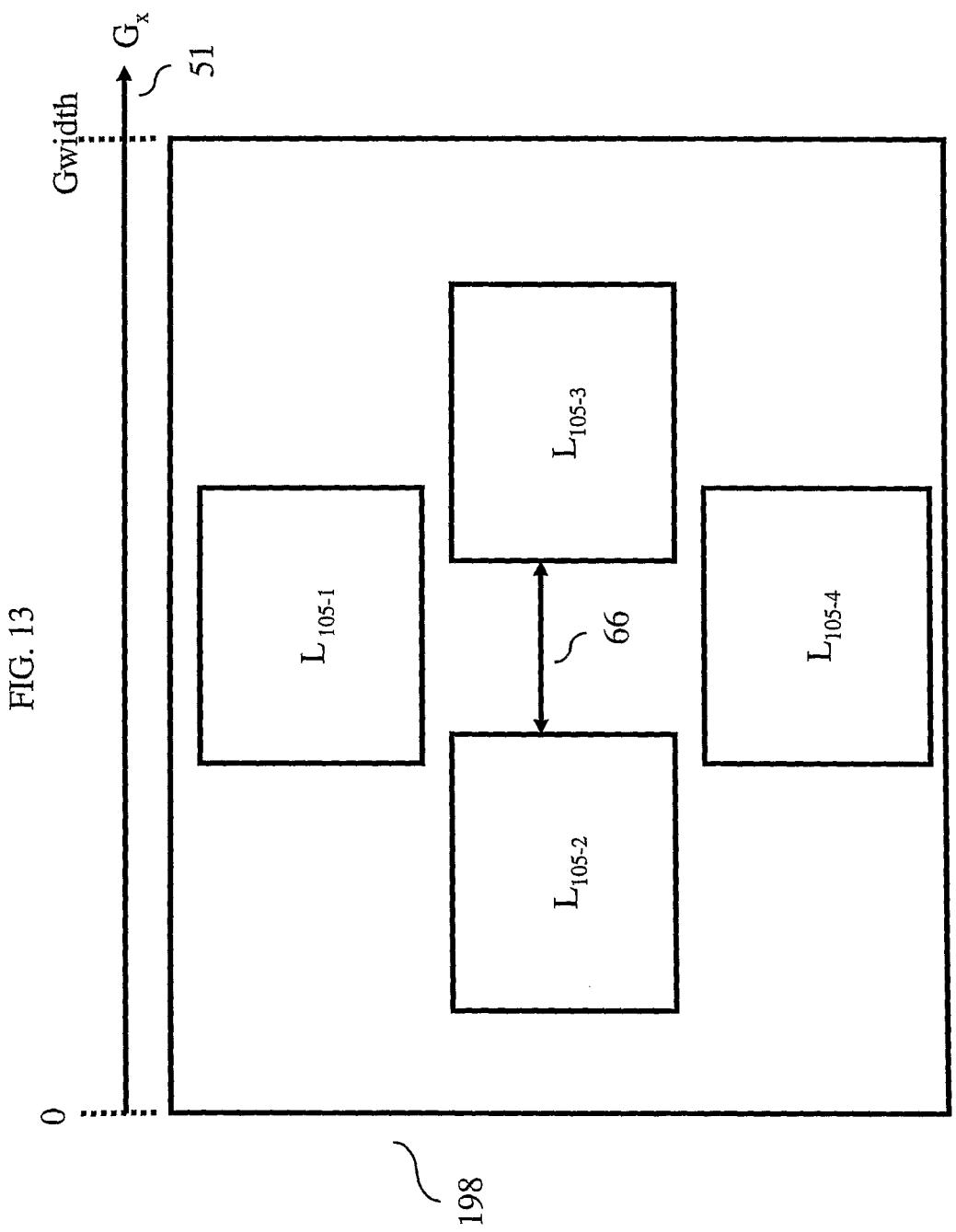
FIG. 13 shows another illustrative mapping for M/E units to a screen in accordance with the principles of the invention.

Other examples of the inventive concept are possible. One example is shown in FIG. 11. Video system 15 of FIG. 11 is similar to video system 10 of FIG. 1 except that the DVE channels are external to the M/E and are coupled by signaling including "effects send" (from an M/E to a DVE channel) and "return" (from a DVE channel to an M/E) as known in the art. This signaling is represented in FIG. 11 by signals 109-1, 109-2 and 109-3. Another example of the inventive concept is shown in FIGS. 12 and 13. Video system 20 of FIG. 12 is similar to video system 10 of FIG. 1, except that video system 20 now includes four M/E (M/E 105-1, M/E 105-2, M/E 105-3 and MIE 105-4), where each M/E is associated with a respective projector device (projector device 150-1, projector device 150-2, projector device 150-3, and projector device 150-4) for projecting video/images onto wide-extended screen 198 having four display portions (198-1, 198-2, 198-3 and 198-4). For simplicity, DVE channels are not shown. An illustrative mapping between global coordinates and the local space associated with each M/E is shown in FIG. 13, where Gwidth, represents the maximum effective display width for wide-extended screen 198. In this example, the local spaces ($L_{105-1}$, $L_{105-2}$, $L_{105-3}$ and $L_{105-4}$) are defined such that there is a gap between the local spaces, as illustrated by gap 66 between $L_{105-2}$ and $L_{105-3}$.

Figure 14:
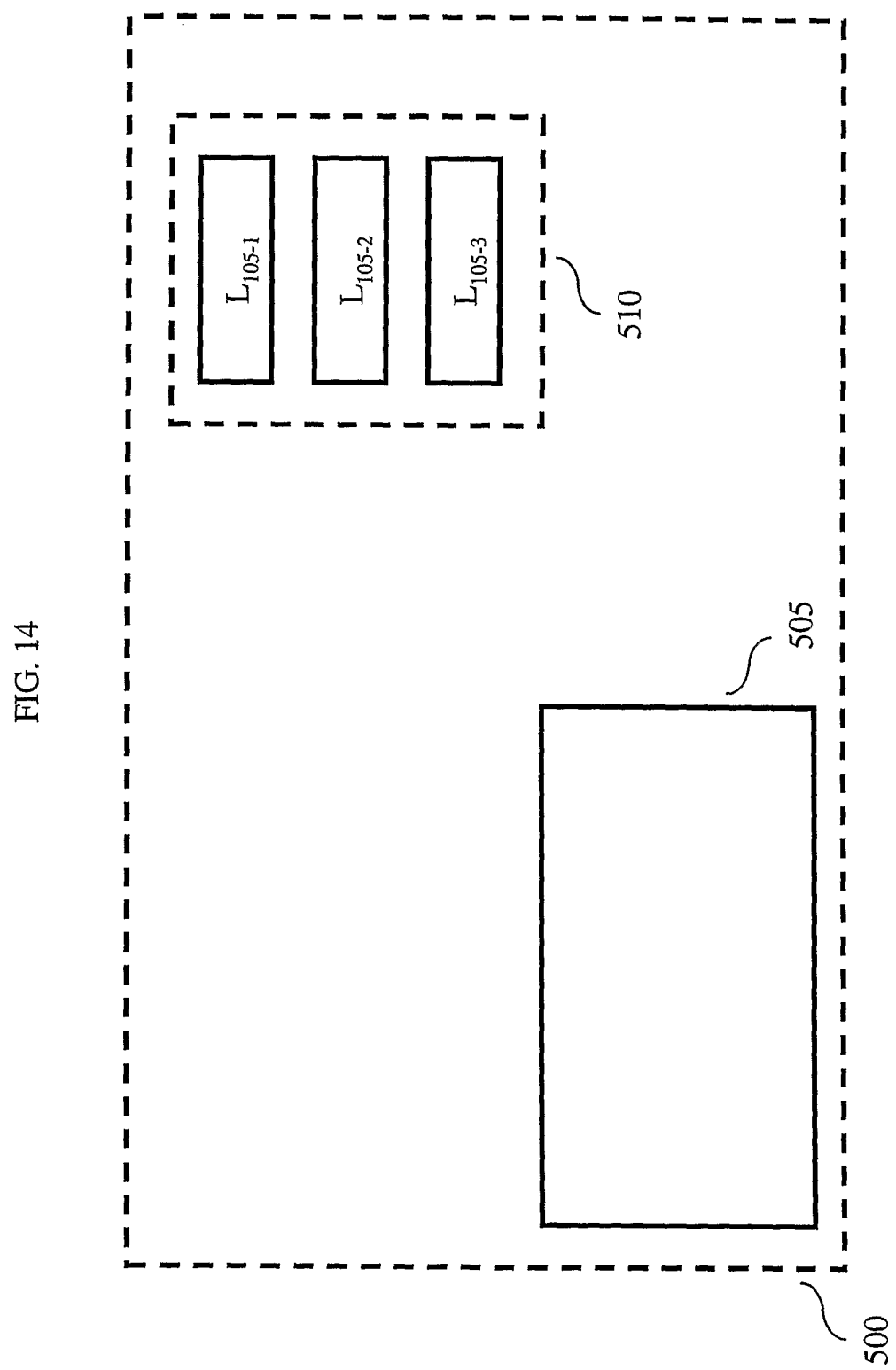
FIGS. 14 and 15 show an illustrative graphical user interface for use in accordance with the principles of the invention.
Figure 15:
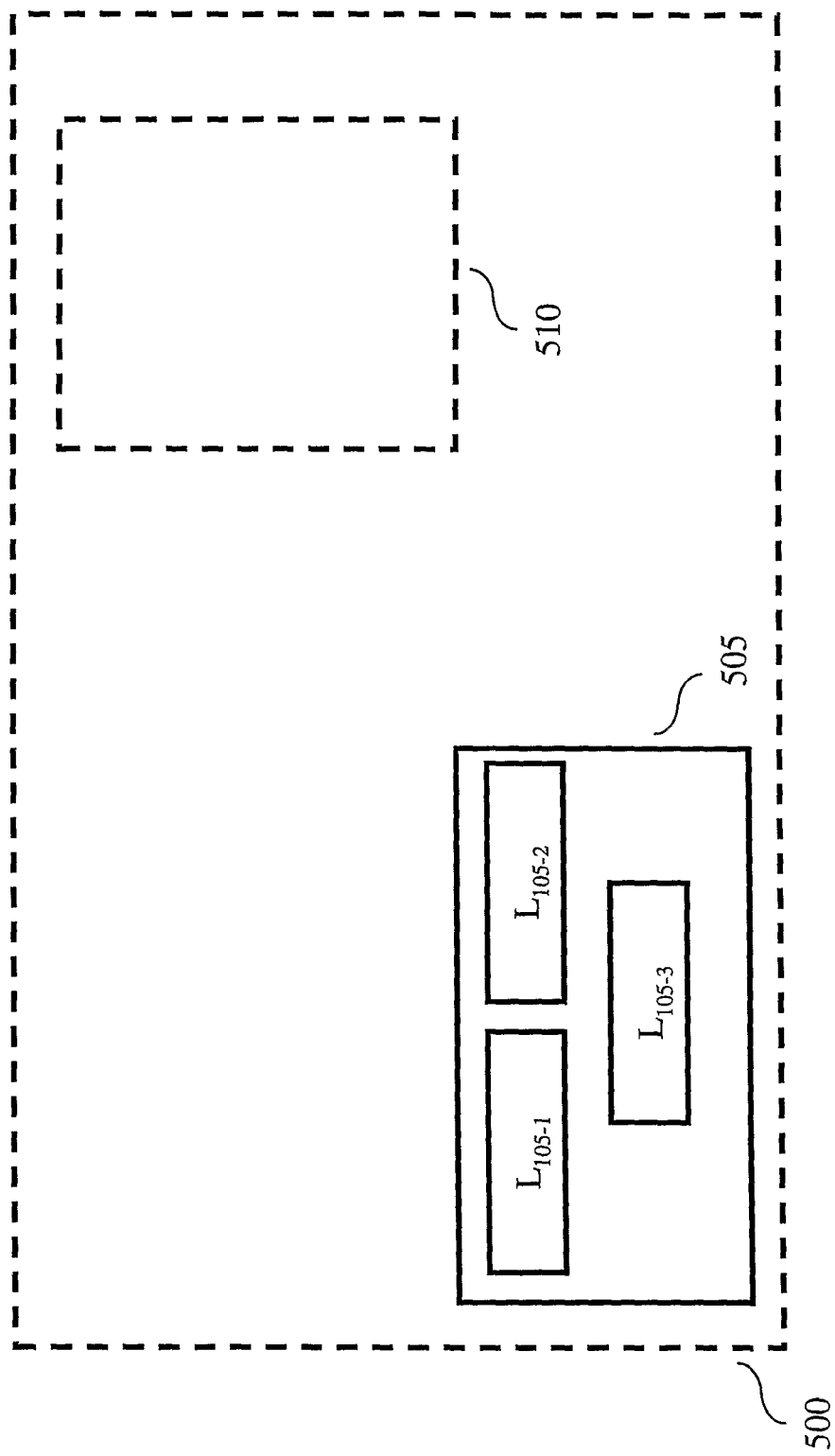

In accordance with the principles of the invention, a graphical user interface (GUI) can be implemented for providing a graphical means for defining the spatial relationship between the global coordinate space and the various local M/E spaces. This GUI can be a part of the above-noted control panel (e.g., a personal computer having a display (i.e., a computer display)). An abstract representation of such a GUI shown on the computer display is illustrated in FIGS. 14 and 15. Turning first to FIG. 14, a GUI screen 500 comprises graphical elements 505 and 510. Graphical element 505 proportionally represents a projection screen (or display) in terms of length and width on which video is displayed (or projected). Graphical element 510 represents the local spaces available for assignment to the display. In accordance with the principles of the invention, each local space is associated with one M/E. The GUI interface enables the dragging and dropping of one or more of the local spaces shown in graphical element 510 into graphical element 505. Thus, the operator can specify the mapping between each M/E and the display. This is illustrated in FIG. 15, which illustrates a mapping of the local spaces to the display. In addition, although not shown in FIGS. 14 and 15, the size of each local space may be adjusted between some predefined minimum values and maximum values. For example, it may be desired that a particular portion of the display show less than the full PGM output of an associated M/E.

As noted earlier, in a widescreen mode, the various known controls of a video production switcher, e.g., joystick, menus and knobs for DVE channels, now operate on the image in the above-defined global space. Keyframing operations are unaffected, but by creating timelines with all M/Es enabled, such keyframes will from a viewer's perspective, show video flying across the multi-projector/.screen space. It should be noted that in order to facilitate control by an operator, the following additional changes should be made to the normal operation of the switcher control panel. First, background transitions should be coordinated. In particular, M/E coupling should be automatically activated for all background and key buses, such that a selection made on one M/E is made on all the other M/Es. Also, all transition selections should be copied to the other M/Es. For example if a "key3" as known in the art is selected as the next transition on, e.g., M/E 105-1 of FIG. 1, then "key3" is selected on M/Es 105-2 and 105-3. Further, all transitions and lever arms should be copied (or echoed, as known in the art) on the other M/Es so that a cut or mix is affected across all M/Es simultaneously. Finally, key cut and mix buttons should be excluded from the mechanism described above, so that a key can be brought into the localized area of one M/E without affecting another screen.

As described above, and in accordance with the principles of the invention, it is possible to modify an existing video production switcher in such a way as to provide video effects on portions of a display as though the portions were one surface—without requiring either specialized hardware or limitations on real-time video production. For example, as illustrated by the above-described embodiment, a video production switcher includes a wide-screen control application that enables the collaborative control of individual M/Es to provide video effects on a large projection screen as though the large projection screen was one large surface. As such, the controller defines screen geometries and the spatial relationship between them (i.e., the M/E local spaces and the projection screen) and synchronizes transitions across multiple M/Es to provide the ability to dynamically fly video (e.g., a PIP) across the whole canvas as though it was one screen and one projector.

It should be noted that although the inventive concept is described in the context of a particular number of M/Es, projectors and display screens, the inventive concept is not so limited and other numbers, smaller and/or larger, in any combination may be used for the respective elements. For example, the inventive concept is also applicable to a display comprising a number of screens, i.e., a multi-screen display, where each local space is still mapped to a portion of the display and each portion maybe less than, equal to, or greater than, a size of a particular one of the screens of the multi-screen display. Further, although described in the context of modifying an existing video production switcher, the inventive concept is applicable to any future video production switcher.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one or more integrated circuits (ICs). Similarly, although shown as separate elements, any or all of the elements may be implemented in a stored-program-controlled processor, e.g., a digital signal processor, which executes associated software, e.g., corresponding to one or more of the steps shown in, e.g., FIG. 4, etc. It is therefore to be understood that numerous modifications may be made to the illustrative embodiments and that other arrangements may be devised without departing from the spirit and scope of the present invention as defined by the appended claims.

The invention claimed is:

1. A method for use in a video production switcher for providing video signals for use in displaying an image on a display, the method comprising:
    mapping an image to a global space, the global space associated with the display;
    defining a local space for each mix effects unit, wherein the local space is part of the global space;
    mapping the image from the global space to at least one local space to determine which mix effects unit displays the image; and
    calculating a transform matrix for at least one mix effects unit to display the image mapped to the at least one mix effect unit assigned to the local space on the global space, wherein the image may be partially displayed at various times using more than one mix effects unit.

2. The method of claim 1, further comprising the step of:
    assigning at least one of the number of local spaces to a particular portion of the global space.

3. The method of claim 2, wherein the assigning step assigns at least two of the local spaces to the global space such that those assigned local spaces are adjacent in the global space.

4. The method of claim 2, wherein the assigning step assigns at least two of the local spaces to the global space such that those assigned local spaces are separated by a gap in the global space not covered by any other local space.

5. The method of claim 2, wherein the assigning step comprises:
    displaying a graphical user interface which comprises a representation of the global space and a representation of at least one of the number of local spaces;
    wherein the graphical user interface allows the representation of the at least one of the number of local spaces to be arranged within the representation of the global space for assignment to the particular portion of the global space.

6. The method of claim 5, wherein a size of the local space is adjustable.

7. Apparatus comprising:
    a number of mix effects units, each mix effects unit providing a video output signal for use in displaying images on a display, wherein each mix effects unit is mapped from a global space to at least one local space to determine which mix effects unit displays the image, wherein the image may be partially displayed at various times using more than one mix effects unit; and
    a controller for controlling the presentation of a video effect on the display by each mix effects unit as a function of a mapping between a local space assigned to each mix effects unit and a global space associated with the display.

8. The apparatus of claim 7, wherein the controller provides a transform matrix that remaps at least a portion of the video effect from a global space associated with the display to at least one of the local spaces.

9. The apparatus of claim 8, wherein the controller assigns at least one of the local spaces to a particular portion of the global space.

10. The apparatus of claim 9, wherein the controller assigns two of the local spaces to the global space such that those two assigned local spaces are adjacent in the global space.

11. The apparatus of claim 9, wherein the controller assigns two of the local spaces to the global space such that those two assigned local spaces are separated by a gap in the global space not covered by any other local space.

12. The apparatus of claim 7, further comprising
a number of projector devices, each projector device associated with one of the mix effects units, wherein each projector device is responsive to the video output signal from its mix effects unit for displaying an image on the display.

13. The apparatus of claim 12, further comprising the display, which includes a number of screens, wherein each screen is mapped to one of the mix effects units.

14. The apparatus of claim 7, wherein at least one local space is smaller than a display area of the display.

15. The apparatus of claim 7, wherein the controller comprises a memory for storing a mapping between each local space and the respective display.

16. The apparatus of claim 7, further comprising
a second display for displaying a graphical user interface which comprises a representation of a global space representing the display and a representation of at least one of the number of local spaces;
wherein the graphical user interface allows the representation of the at least one of the number of local spaces to be arranged within the representation of the global space for assignment to the particular portion of the global space.

17. The apparatus of claim 16, wherein a size of the local space is adjustable.

* * * * *